United States Patent
Yamashita et al.

[19]

[11] Patent Number: 5,833,049
[45] Date of Patent: Nov. 10, 1998

[54] VEHICLE MAIN SWITCH

[75] Inventors: Akihiko Yamashita; Hiroyuki Nakajima, both of Saitama, Japan

[73] Assignee: Honda Giken Kogyo Kabushiki Kaisha, Tokyo, Japan

[21] Appl. No.: 825,218

[22] Filed: Mar. 27, 1997

[30] Foreign Application Priority Data

Mar. 27, 1996 [JP] Japan .................................. 8-072967
Jul. 2, 1996 [JP] Japan .................................. 8-172697

[51] Int. Cl.$^6$ .................................................. H01R 33/955
[52] U.S. Cl. .................... 200/284; 200/43.08; 200/51.12; 439/135; 439/660
[58] Field of Search .............................. 200/43.02, 43.08, 200/284, 51.07, 51.12; 439/660, 682, 135, 136, 142

[56] References Cited

U.S. PATENT DOCUMENTS 4,678,121  7/1987  Douty et al. .................... 439/660 X
4,839,483  6/1989  Doyle ............................... 200/284 X
5,070,221  12/1991 Weber ................................. 200/284
5,252,791  10/1993 Williams ......................... 200/43.08 X

FOREIGN PATENT DOCUMENTS 54-5479  3/1979  Japan .

Primary Examiner—Renee S. Luebke

[57] ABSTRACT

A vehicle main switch includes a moving member with a movable contact, the moving member being detachably fitted to a crankshaft. A terminal is slidably contactable with the movable contact. The terminal is supported by and extends through an insulating plate. A cover is provided to cover the terminal. The moving member is fitted to the crankshaft so that the moving member, the insulating plate and the cover can be turned together through a predetermined angle in a direction of rotation of the crankshaft when the moving member is detached from the crankshaft. The cover includes a window through which a wiring coupler may be detachably coupled to the terminal.

16 Claims, 11 Drawing Sheets

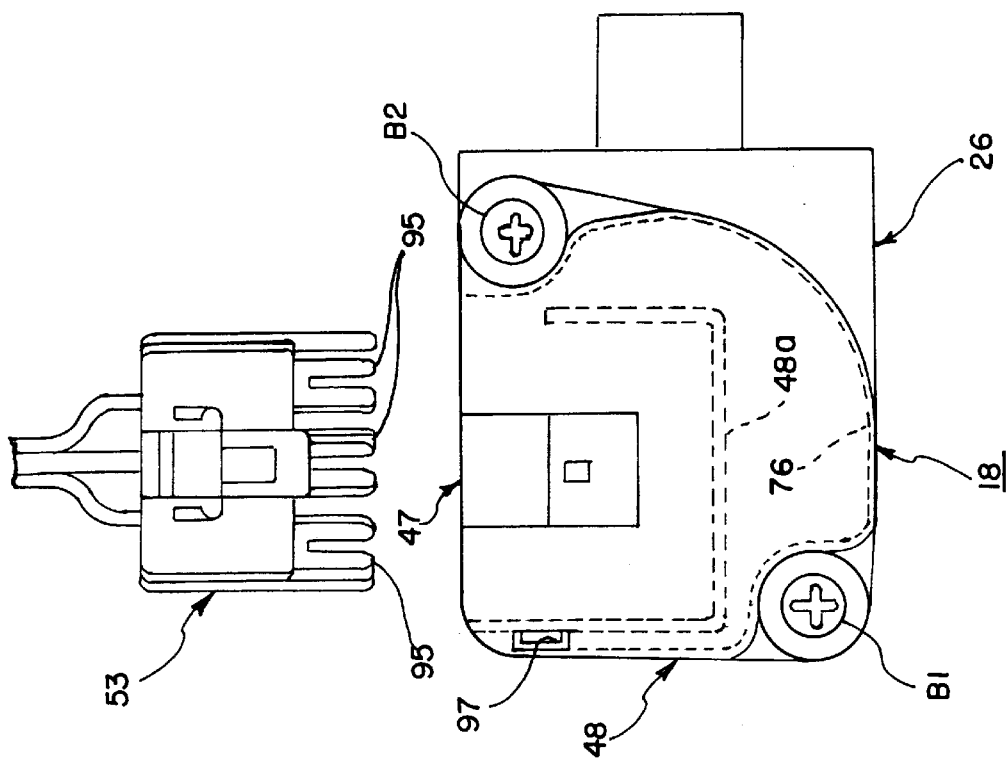
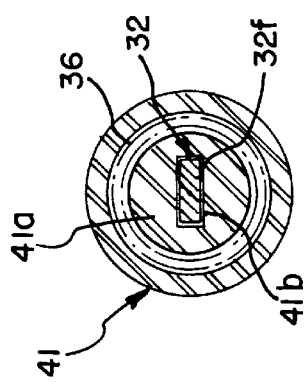
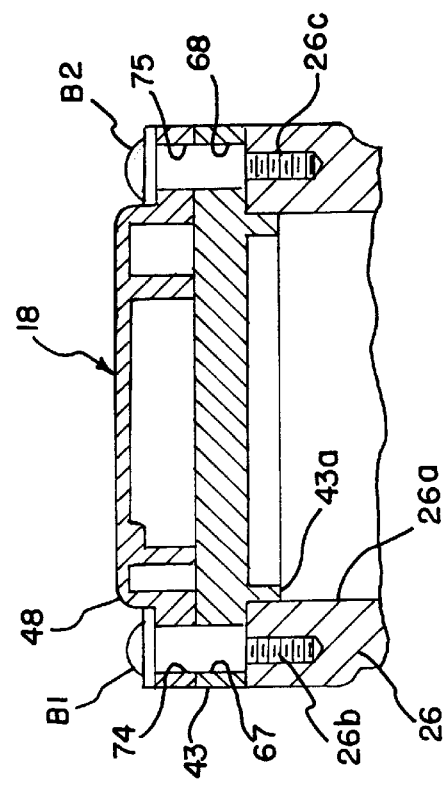
FIG. 7
FIG. 8
FIG. 9

VEHICLE MAIN SWITCH

BACKGROUND OF THE INVENTION

1. Field of the Invention

The present invention relates to a main switch of a vehicle.

2. Description of the Background Art

As a main switch of a vehicle, Japanese published unexamined utility model application Sho 54-5479, discloses a conventional steering locking device, which is illustrated in FIG. 14.

FIG. 14 is a sectional view showing the above-noted conventional type vehicle steering locking device. The steering locking device 200 is provided with a switch box 201 in a lower part thereof and a switch member 203 which is turned together with key 202 inside switch box 201.

Switch member 203 is provided with a moving contact plate 204 and fixed contact plates 206 and 207 respectively attached to an insulating plate 205. These fixed contact plates 206 and 207 are fixed by riveting terminals 208 and 209. Reference number 211 denotes a coupler.

As force in the direction shown by the arrow operates upon terminals 208 and 209 and this force is applied to each riveted portion of fixed contact plates 206 and 207 when another coupler C provided with a female terminal is repeatedly inserted and extracted into/from coupler 211 in the direction shown by the arrow, this portion is readily rattled.

In such a case, to maintain electric connection respectively between terminals 208 and 209 and fixed contact plates 206 and 207, there is a method for example in which the set of terminal 208 and fixed contact plate 206 and the set of terminal 209 and fixed contact plate 207 are respectively soldered together. However, there is a problem that quality control for preventing resin insulating plate 205 from becoming deformed or softened by heat generated during soldering is difficult.

Further, there is a problem that assembling performance is deteriorated by such a method of fixing by riveting and soldering because terminals 208 and 209 and fixed contact plates 206 and 207 are separate parts.

SUMMARY OF THE INVENTION

An object of the present invention is to provide a main switch of a vehicle having a terminal and a fixed contact which are integrated. The switch is readily fixed and is inexpensive. The switch also exhibits reduced rattling.

To achieve these and other objects, in a first embodiment of the present invention a terminal pierces an insulating plate, a contact section is provided inside the insulating plate and a terminal section is provided outside the insulating plate.

As the contact section and the terminal section can be integrated, the terminal can be readily assembled and the number of parts can be reduced.

According to a further embodiment, the terminal is fixed to the insulating plate by press fitting. The terminal can thus be readily and securely fixed to the insulating plate such that rattling is reduced.

According to a still further embodiment, a band plate is used for the terminal section. The band plate is surrounded by a cover. An entry for a wiring coupler is provided in the cover and this entry is opposite to one side end face of the band plate. When a wiring coupler is inserted into the entry, force operates from the direction opposite to the side end face of the terminal section. However, as this force is supported in the direction of the width of the terminal section, bending of the terminal section is reduced and rattling can be prevented.

According to another embodiment, the main switch includes a lock external cylinder attached to the body. A crankshaft is housed in the lock external cylinder. A lock pin is deposited and withdrawn by the crankshaft. A moving member is fitted to the lower part of the crankshaft so that the moving member can be attached or detached. A terminal comes into sliding contact with a moving contact attached to the moving member. An insulating plate supports the terminal. A cover for covering the lower part of the terminal pierces the insulating plate. An entry for a wiring coupler is provided in this cover. Also provided are plural machine screws for fitting the cover and the insulating plate in the lock external cylinder. The moving member is fitted to the crankshaft so that the moving member, the insulating plate and the cover can be turned by a predetermined angle in the direction of the rotation of the crankshaft together in a state in which the machine screws are unfastened and the moving member is detached from the crankshaft.

The direction in which a wiring coupler is inserted can be varied, depending upon the model in which it is used, by a set including the moving member, the insulating plate and the cover. The moving member, the insulating plate and the cover of the type corresponding to the direction of insertion are not required to be prepared in advance and the costs of manufacturing and management can thus be reduced.

According to another embodiment, a terminal pierces an insulating plate, a contact section is provided inside the insulating plate and a terminal section is provided outside the insulating plate. As the contact section and the terminal section can be integrated, the terminal can be readily attached, the number of parts can be reduced and cost can be further reduced, in addition to the reduction of costs described in the previous described embodiment of manufacturing and management of various types of moving members, insulating plates and covers.

According to yet another embodiment, the cover is constituted by an end section. An external wall section rises from the periphery of the end section. An internal wall section covers the lower part of the terminal and an entry. When the entry is turned downward, a drain hole for a space between the internal and external wall sections is formed in the lower location.

Since the contact section and the terminal section can be integrated, a terminal can be readily attached such that the number of parts can be reduced. Water in a space between the internal and external wall sections can be discharged from the drain hole and damage of the terminal by water can be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 7 is a sectional view along a line 7—7 of FIG. 3;

FIG. 8 is a sectional view along a line 8—8 in FIG. 6A;

FIG. 9 is a bottom view showing an example in which the position of an entry for a wiring coupler of the FIG. 4 embodiment is changed;

DETAILED DESCRIPTION OF THE PREFERRED EMBODIMENTS

Figure 1:
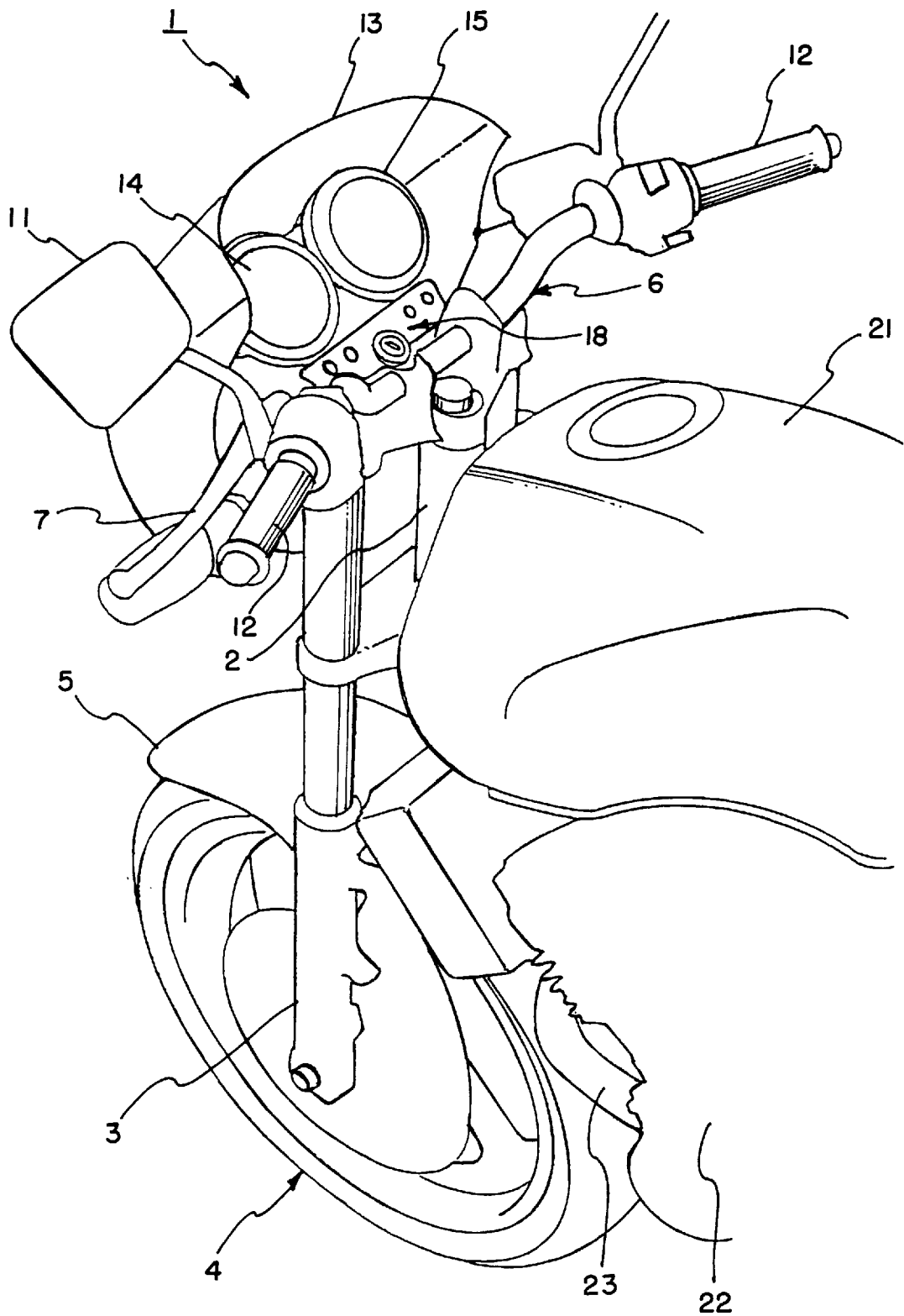
FIG. 1 is a perspective drawing showing a front of a motorcycle provided with a main switch according to an embodiment of the present application.

FIG. 1 is a perspective drawing showing the front of a motorcycle provided with a main switch according to an embodiment of the present application.

Motorcycle 1 is provided with a steering head 2 attached to the front of a frame not shown. Front fork 3 is attached to steering head 2 via a handle post, which is also not shown, so that front fork 3 can be turned. A front tire 4 is provided with a wheel attached to the end of front fork 3. Front fender 5 covers the upper part of front tire 4. Handle 6 is provided for integrally turning front fork 3. Clutch lever 7 is attached on the left side of handle 6. A front brake lever not shown, rear-view mirrors 11 (the left rear-view mirror only being shown) and grips 12 are respectively attached to the right and left ends of handle 6.

Further, motorcycle 1 is provided with windshield 13, speedometer 14, tachometer 15 and main switch 18 respectively attached to the front of steering head 2. A fuel tank 21 is attached to the upper part of the vehicle frame at the back of steering head 2. Engine 22 is attached to the vehicle frame under fuel tank 21. Exhaust pipe 23 extends out from the front of engine 22.

Figure 2:
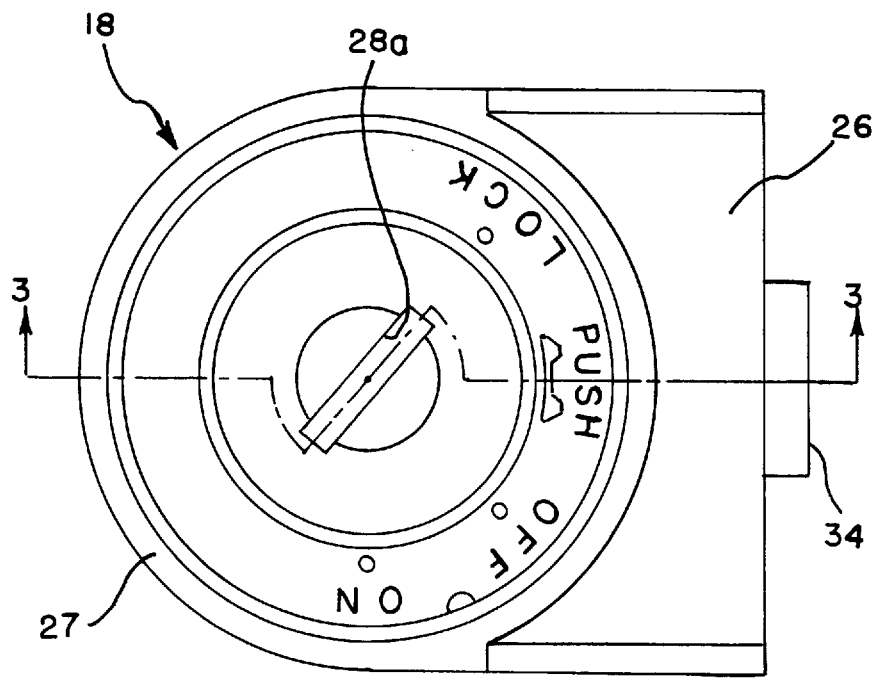
FIG. 2 is a plan view showing a first embodiment of the main switch.

FIG. 2 is a plan view showing a first embodiment of the main switch. Main switch 18 is provided with key hole 28a and marks OFF and ON on the upper surface showing a position in which a key K shown in FIG. 3 is turned, and marks PUSH and LOCK.

When main switch 18 is in the OFF position, engine 22 shown in FIG. 1 is in a stopped state and handle 6 is in an unlocked state. Key K can be inserted into key hole 28a when main switch 18 is in this position.

When main switch 18 is turned to the ON position using key K, engine 22 is in a state in which it can be started. When a starter switch is then turned on, the engine is started. The handle 6 is naturally in an unlocked state.

Figure 3:
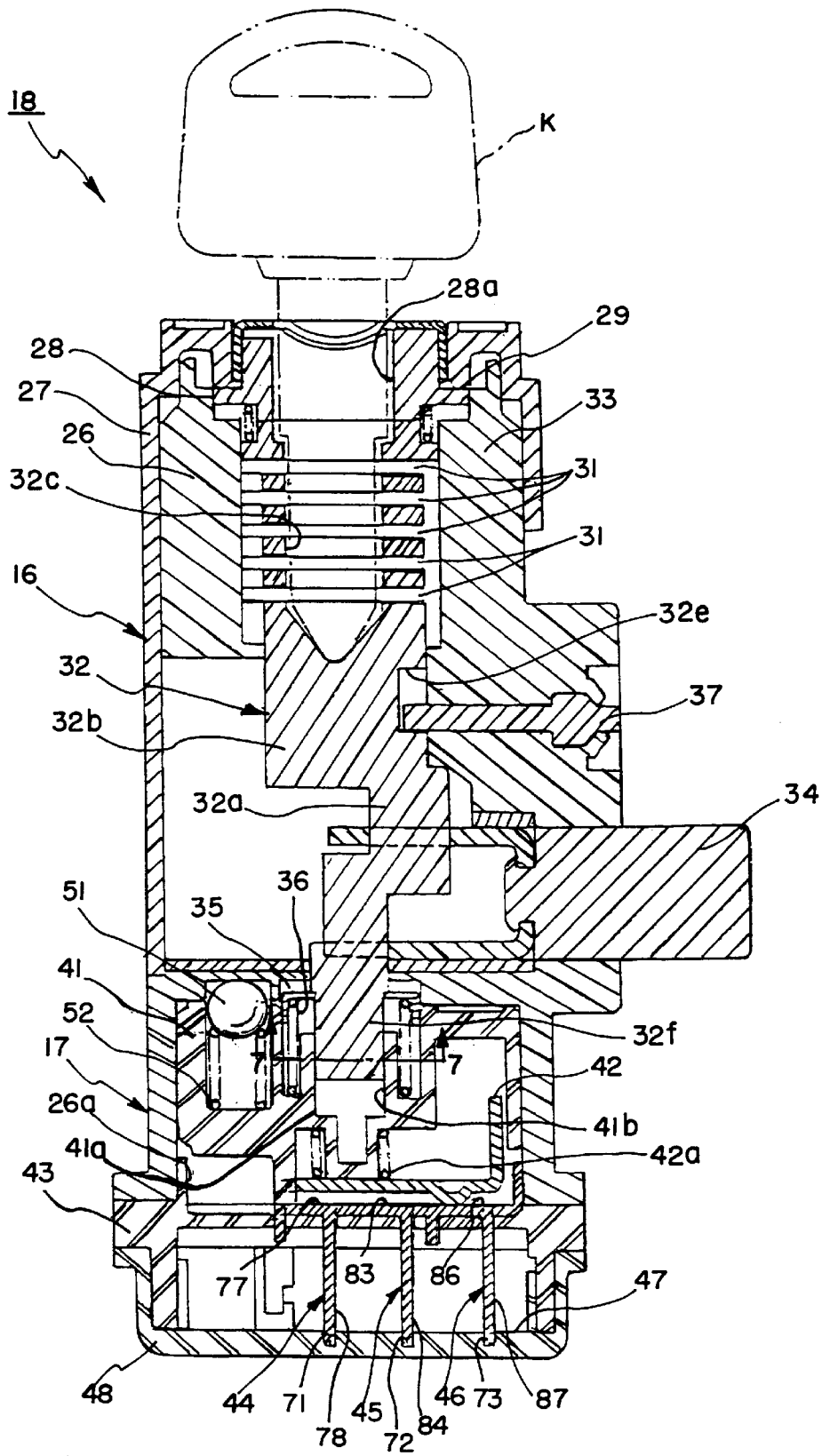
FIG. 3 is a sectional view along line 3—3 of FIG. 2.

FIG. 3 is a sectional view along line 3—3 of FIG. 2. Main switch 18 consists of a handle locking section 16 in an upper part thereof and an ignition switch 17 in a lower part thereof. Handle locking section 16 consists of lock external cylinder 26 attached to the body. Cover 27 covers the lock external cylinder 26. Protector block 28 is housed above lock external cylinder 26 so that protector block 28 can be turned and vertically moved. Key hole 28a is formed by protector block 28. Coil spring 29 presses protector block 28 upward.

Handle locking section 16 also consists of a crankshaft 32 housed under protector block 28. Crankshaft 32 can be turned and vertically moved by inserting key K into key inserting hole 32c of the linear section 32b over crank 32a. Crankshaft 32 is provided with tumblers 31 in linear section 32c. Lock pin 34 is locked or unlocked by crank 32a of crankshaft 32. Coil spring 36 presses crankshaft 32 upward via retainer 35. Control pin 37 is fixed to lock external cylinder 26 and has an end which is inserted into cam groove 32e formed on the side of crankshaft 32 for controlling vertical motion and turning of crankshaft 32.

Ignition switch 17 consists of resin moving part 41 which is housed under lock external cylinder 26 and which can be turned together with crankshaft 32. Moving contact 42 is attached to the lower part of moving part 41. Coil spring 42a presses moving contact 42 downward. Insulating plate 43 is attached to the lower part of lock external cylinder 26. First terminal 44, second terminal 45 and third terminal 46 are press-fit into insulating plate 43 and are fixed to touch moving contact 42.

Ignition switch 17 also consists of resin cover 48 which is attached to insulating plate 43 for covering first, second and third terminals 44, 45 and 46 and which forms entry 47 for inserting wiring coupler 53 (shown in FIG. 6) therein against insulating plate 43. Reference number 51 denotes a ball for positioning moving part 41 and reference numeral 52 denotes a coil spring for pressing ball 51.

Figure 4:
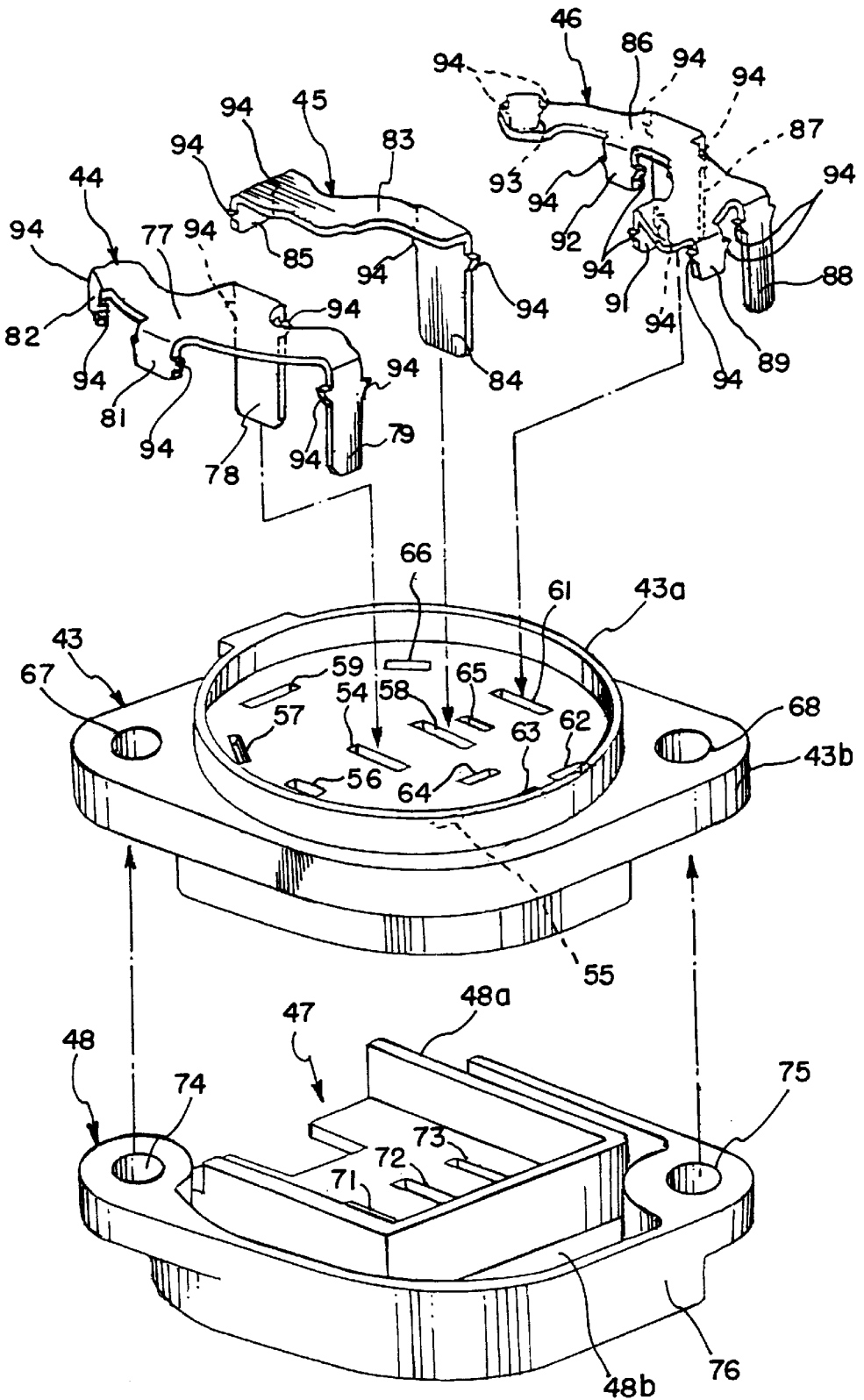
FIG. 4 is an exploded perspective view of an embodiment showing a part in which a terminal is attached to the main switch.

FIG. 4 is an exploded perspective drawing showing a terminal attachment part of the main switch according to a first embodiment. Insulating plate 43 is provided with cylinder section 43a for engaging with the inside 26a of lock external cylinder 26 shown in FIG. 3. Through slots 54, 55, 56, 57, 58, 59, 61, 62, 63, 64, 65 and 66 are provided inside cylinder section 43a for attachment to first, second and third terminals 44, 45 and 46. Flange 43b protrudes outside cylinder section 43a. Reference numbers 67 and 68 denote mounting holes for attaching insulating plate 43 to lock external cylinder 26.

Cover 48 is provided with internal wall section 48a rising on the side to which the insulating plate 43 is attached. Grooves 71, 72 and 73 are provided inside internal wall section 48a. External wall section 76 surrounds internal wall section 48a and end section 48b. Reference numbers 74 and 75 are mounting holes for attaching resin cover 48 to lock external cylinder 26 together with insulating plate 43.

Resin cover 48 forms entry 47 for inserting wiring coupler 53, which will be described later and shown in FIG. 6 together with insulating plate 43.

First terminal 44 consists of contact section 77 with which moving contact 42 shown in FIG. 3 comes in sliding contact. Terminal section 78 is bent perpendicularly from contact section 77. Holding sections 79, 81 and 82 are also bent perpendicularly from contact section 77.

Second terminal 45 consists of contact section 83 with which moving contact 42 comes into sliding contact. Terminal section 84 is bent perpendicularly from contact section 83. Holding section 85 is also bent perpendicularly from contact section 83.

Third terminal 46 consists of contact section 86 with which moving contact 42 comes into sliding contact. Terminal section 87 is bent perpendicularly from contact section 86. Holding sections 88, 89, 91, 92 and 93 are also bent perpendicularly from contact section 86. Reference number 94 is a fitting portion for preventing falling.

It is desirable that first, second and third terminals 44, 45 and 46 are stamped.

To attach first terminal 44 to insulating plate 43, first terminal section 78 of first terminal 44 is inserted into through slot 54. Holding section 79 is inserted into through slot 55. Holding section 81 is inserted into through slot 56. Holding section 82 is inserted into through slot 57. Next, fitting portions 94 of terminal section 78 and holding sections 79, 81 and 82 are press-fit so that they respectively bite the inner faces of through slots 54, 55, 56 and 57. First terminal 44 thus is completely fixed to insulating plate 43.

To attach second terminal 45 to insulating plate 43, first terminal section 84 of second terminal 45 is inserted into through slot 58. Holding section 85 is inserted into through slot 59. Next, fitting portions 94 of terminal section 84 and holding section 85 are press-fit so that they respectively bite the inner faces of through slots 58 and 59. Second terminal 45 is thus completely fixed to insulating plate 43.

To attach third terminal 46 to insulating plate 43, first terminal section 87 of third terminal 46 is inserted into through slot 61. Holding section 88 is inserted into through slot 62. Holding section 89 is inserted into through slot 63. Holding section 91 is inserted into through slot 64. Holding section 92 is inserted into through slot 65. Holding section 93 is inserted into through slot 66. Next, fitting portions 94 of terminal section 87 and holding sections 88, 89, 91, 92 and 93 are press-fit so that they respectively bite the inner faces of through slots 61, 62, 63, 64, 65 and 66. Third terminal 46 is thus completely fixed to insulating plate 43.

Each end of terminal sections 78, 84 and 87 of first, second and third terminals 44, 45 and 46 is also inserted into grooves 71, 72 and 73 of cover 48. Therefore, both ends of each terminal section 78, 84 and 87 are supported by insulating plate 43 and cover 48 and each terminal section is hardly bent by external force.

Figure 5:
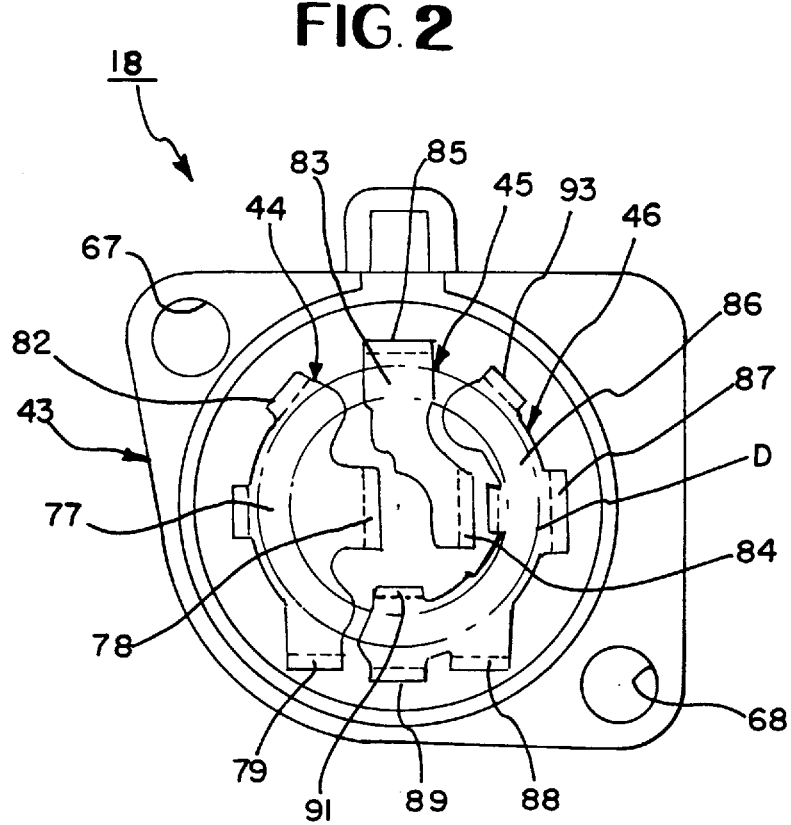
FIG. 5 is a plan view showing a state in which the terminal of the FIG. 4 embodiment is attached to the main switch.

FIG. 5 is a plan view showing a state of the main switch in the first embodiment in which first to third terminals 44 to 46 are attached to insulating plate 43. The contact sections 77, 83 and 86 of first to third terminals 44 to 46 substantially together form a doughnut D. Doughnut D comes into sliding contact with moving contact 42 shown in FIG. 3.

As first terminal 44 is fixed by terminal section 78 and holding sections 79 and 82, which are different in direction as shown in FIG. 5, first terminal 44 is not rattled vertically even if force is applied to terminal section 78 from over entry 47 shown in FIG. 4.

Similarly, as second terminal 45 is fixed by terminal section 84 and holding section 85, which are different in direction, second terminal 45 is not rattled vertically even if force is applied to terminal section 84 from over entry 47 shown in FIG. 4.

Similarly, as third terminal 46 is fixed by terminal section 87 and holding sections 88, 89, 91 and 93, which are different in direction, third terminal 46 is not rattled vertically even if force is applied to terminal section 87 from over entry 47 shown in FIG. 4.

Figure 6B:
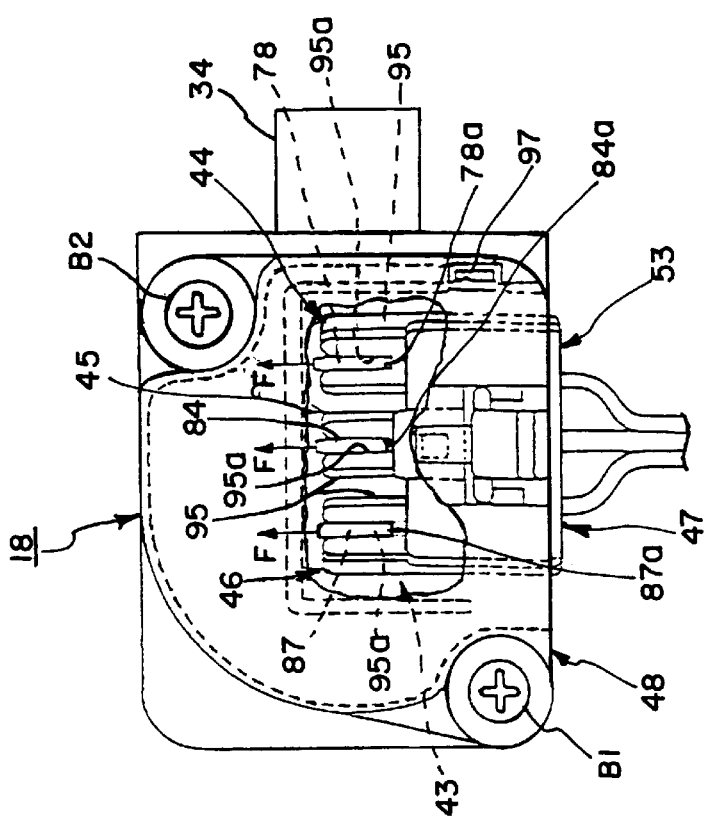
FIGS. 6A and 6B are bottom views which illustrate the connection of a wiring coupler to the main switch in the FIG. 4 embodiment.
Figure 6A:
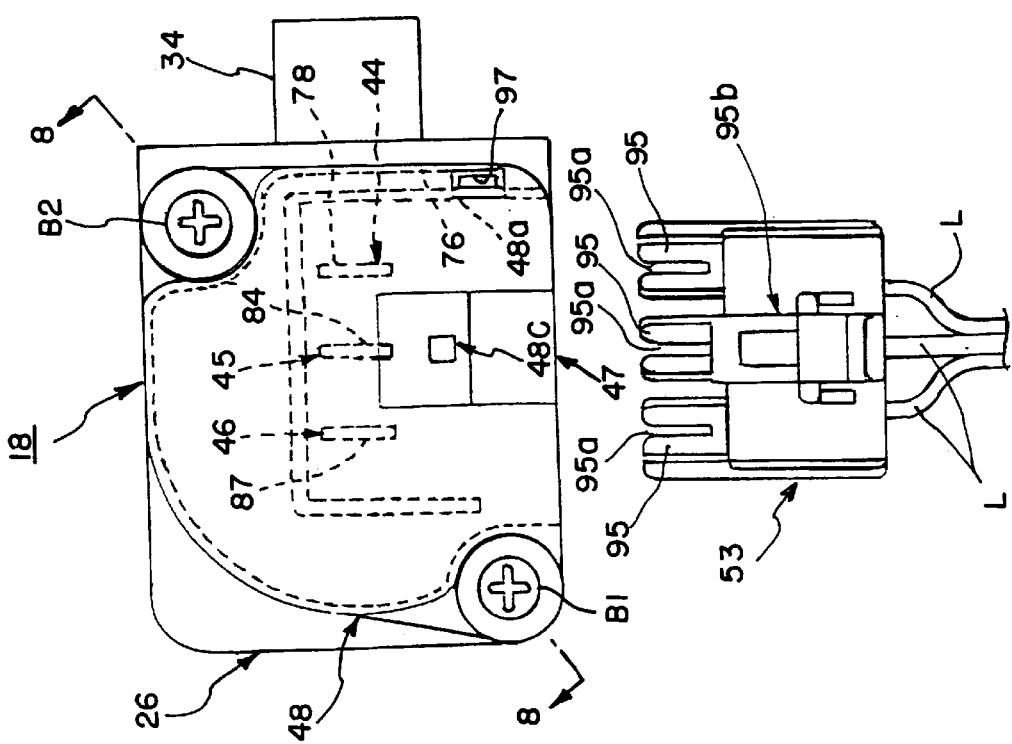

The operation of the first embodiment of the main switch described above will be described hereinafter. FIGS. 6A and 6B are bottom views illustrating the connection of a wiring coupler to the main switch according to the first embodiment. FIG. 6A shows a state before a wiring coupler is inserted and FIG. 6B shows a state after a wiring coupler is inserted.

As shown in FIG. 6A, wiring coupler 53 is provided with terminals 95 respectively connected to lead wires L which extend from the body. Each terminal 95 is provided with a grip 95a for respectively connecting to first to third terminals 44 to 46 of main switch 18. Reference number 95b denotes a fitting portion for preventing coupler 53 from falling by fitting to fitted portion 48c provided to cover 48. Reference characters B1 and B2 denote machine screws for attaching insulating plate 43 and cover 48 to lock external cylinder 26.

Cover 48 is provided with drain hole 97 for discharging water from cover 48.

When main switch 18 is attached to the body so that entry 47 for wiring coupler 53 is turned downward, drain hole 97 is formed in the lower location in a space between internal wall section 48a and external wall section 76 of cover 48. Rainwater flowing between internal wall section 48a and external wall section 76 is discharged from drain hole 97 by providing drain hole 97 as described above. Each terminal 44, 45 and 46 is therefore prevented from being damaged by rainwater.

As shown in FIG. 6B, when wiring coupler 53 is inserted into entry 47 formed by insulating plate 43 and cover 48, grip 95a of each terminal 95 is pressed outward respectively by terminal sections 78, 84 and 87 of first to third terminals 44 to 46 and is elastically deformed. Each grip 95a is respectively connected to terminal sections 78, 84 and 87 by return force due to elastic deformation. While coupler 53 is inserted, reaction force F by friction generated by return force due to the above elastic deformation between each of terminal sections 78, 84 and 87 and grip 95a is generated as shown by arrows.

In FIG. 3, reaction force F operates terminal sections 78, 84 and 87 in the direction perpendicular to the surface of the drawing. However, as first to third terminals 44 to 46 are respectively integrated and fixed by press-fitting, the end of terminal sections 78, 84 and 87 are respectively inserted into grooves 71, 72 and 73 of cover 48. Each terminal is respectively inserted opposite to side end faces 78a, 84a and 87a of terminal sections 78, 84 and 87 as shown in FIG. 6B. The terminals are therefore securely fixed and hardly rattled.

FIG. 7 is a sectional view taken along line 7—7 in FIG. 3. Moving part 41 is provided with a boss section 41a formed in the center and a minus sign-shaped groove 41b on the upper surface of boss section 41a. Moving part 41 is turned together with crankshaft 32 by engaging the minus sign-shaped groove 41b with a minus sign-shaped end 32f formed at the lower end of crankshaft 32.

FIG. 8 is a sectional view taken along line 8—8 in FIG. 6A. To attach insulating plate 43 and cover 48 to lock external cylinder 26, first cylinder section 43a of insulating plate 43 is fitted to the inside of lock external cylinder 26. Next, cover 48 is arranged outside insulating plate 43 and machine screws B1 and B2 are respectively inserted into mounting holes 74 and 75 of the cover. Mounting holes 67 and 68 of insulating plate 43 and female screws 26b and 26c of lock external cylinder 26 are fastened to fix insulating plate 43 and cover 48 to lock external cylinder 26. Other fastening members such as screws and bolts can be used instead of machine screws B1 and B2. It is obvious that rivets can also be used as the fastening members because, once the main switch is suitably riveted to a specific vehicle, there is no need to remove the switch or to change the direction of the socket of the wiring coupler. Rivets can therefore be used instead of the machine screws if they are set to an angle suitable for a specific vehicle and mass-produced for the vehicles.

FIG. 9 is a bottom view showing an example in which the direction of entry for a wiring coupler according to the first embodiment is changed. Entry 47 of the wiring coupler 53 is turned by 180° with respect to the entry shown in FIG. 6A.

To turn the position of entry 47 by 180°, first the machine screws B1 and B2 are unfastened and cover 48 and insulating plate 43 are detached from lock external cylinder 26 in the state shown in FIG. 6A (see FIG. 8). Next, moving part 41 shown in FIG. 3 is extracted from crank shaft 32, is turned by 180° and again similarly as shown in FIG. 7, minus sign-shaped groove 41b is fitted to minus sign-shaped end 32f. Next, reversely to attachment shown in FIG. 8, insulating plate 43, and cover 48 are turned by 180° and machine screw B1 is inserted into mounting hole 68 of insulating plate 43 mounting hole 75 of cover 48 and female screw 26b of the lock external cylinder 26. The machine screw B2 is inserted into mounting hole 67 of insulating plate 43, mounting hole 74 of cover 48 and female screw 26c of lock external cylinder 26. Machine screws B1 and B2 are then fastened. The direction of entry 47 is thus changed as shown in FIG. 9. Main switch 18 is attached to the body so that the entry is therefore turned downward.

As described above, as entry 47 for wiring coupler 53 can be readily turned by 180° by engaging minus sign-shaped groove 41b of the moving part 41 with minus sign-shaped end 32f of crankshaft 32 shown in FIG. 3 and by attaching insulating plate 43 and cover 48 to lock external cylinder 26 by machine screws B1 and B2 shown in FIG. 9, the direction of entry can be selected depending upon the model of a vehicle. Main switches which have insulating plates and covers with different entry directions are not required to be prepared in advance. Manufacturing and management costs of main switch types can therefore be reduced. Moreover, rainwater flowing between internal wall section 48a and external wall section 76 is discharged from drain hole 97 by turning entry 47 downward. Each terminal 44, 45 and 46 can therefore be protected from being damaged by rainwater.

Figure 10A:
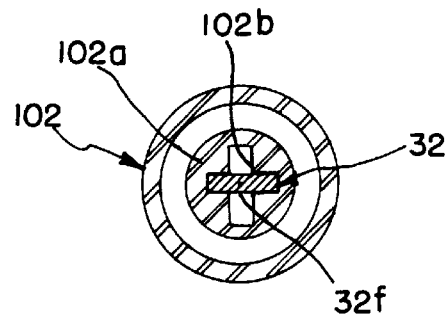
FIGS. 10A and 10B are explanatory drawings which illustrate a second embodiment of the main switch.
Figure 10B:
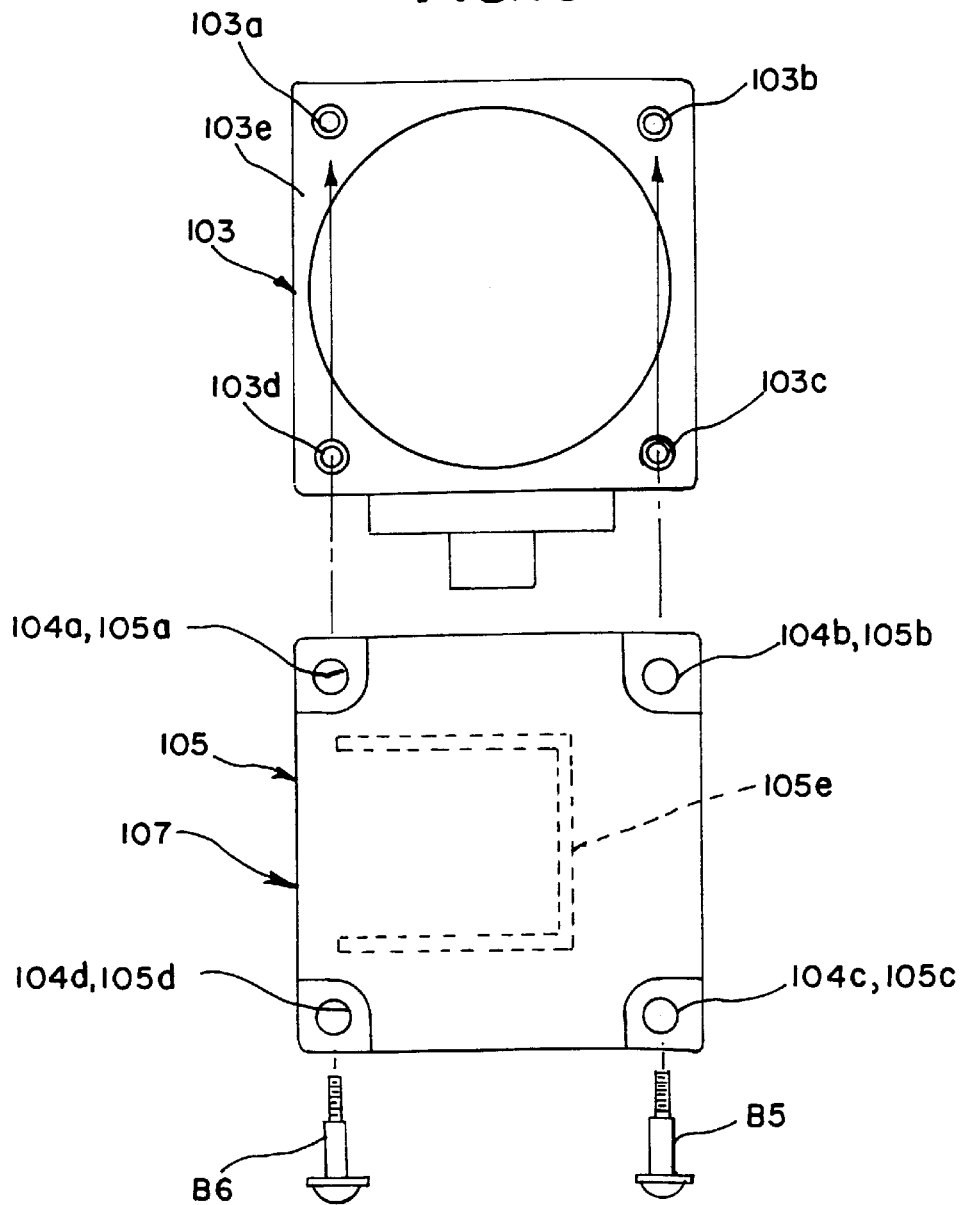

FIGS. 10A and 10B are explanatory drawings showing a second embodiment of the main switch. FIG. 10A is a sectional view in the same position as in FIG. 7, showing a state in which a moving part and a crankshaft are fitted. FIG. 10B is a bottom view showing a state in which an insulating plate and a cover are attached to a lock external cylinder. The same reference numbers are allocated to the same components as those in the first embodiment and detailed description thereof is omitted.

As shown in FIG. 10A, moving part 102 is provided with a plus sign-shaped groove 102b on the end face of boss section 102a. Plus sign-shaped groove 102b and minus sign-shaped end 32f of crankshaft 32 are fitted together. Moving part 102 can thus be fitted to crankshaft 32 by turning the moving part with respect to crankshaft 32 by 90° once.

As shown in FIG. 10B, lock external cylinder 103 is provided with female screws 103a, 103b, 103c and 103d at the corners of mounting face 103e of insulating plate 104, which is not shown. Insulating plate 104 (located on the rear side and not shown) and cover 105 are respectively provided with mounting holes 104a, 104b, 104c, 104d, 105a, 105b, 105c and 105d at the respective four corners. Cover 105 forms entry 107 for inserting a wiring coupler 53 shown in FIG. 9 together with insulating plate 104 on the side of the opening of a C-shaped internal wall section 105e.

To attach insulating plate 104 and cover 105 to lock external cylinder 103, a machine screw B3 not shown is inserted into the mounting holes 104a and 105a of insulating plate 104 and cover 105. Machine screw B3 is driven into female screw 103a of lock external cylinder 103. Similarly, a machine screw B4 not shown is inserted into mounting holes 104b and 105b. Machine screw B4 is driven into female screw 103b. Machine screw B5 is inserted into mounting holes 104c and 105c. Machine screw B5 is driven into female screw 103c. Machine screw B6 is inserted into mounting holes 104d and 105d and is driven into female screw 103d.

Further, to turn the position of entry 107 clockwise by 90° once, insulating plate 104 and cover 105 have only to be turned clockwise by 90° once integrally with respect to lock external cylinder 103. When insulating plate 104 and cover 105 are integrally turned, the above moving part 102 is also turned by the same angle.

Figures 11A, 11B:
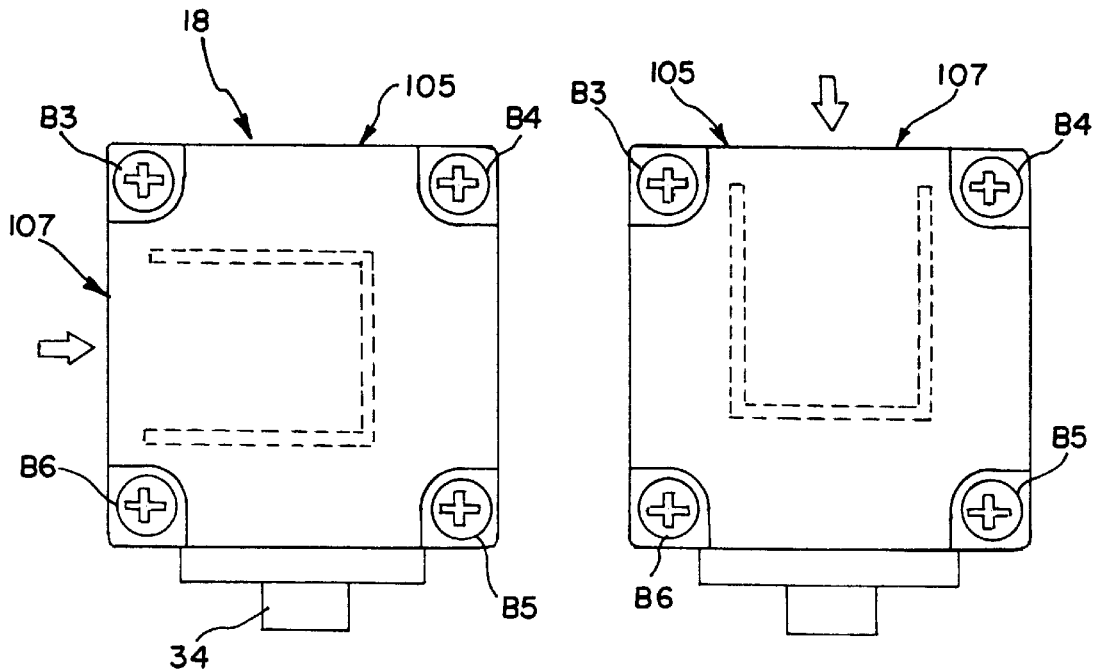
FIGS. 11A–11D are explanatory drawings which illustrate change of direction of the entry in the second embodiment of the main switch.
Figures 11C, 11D:
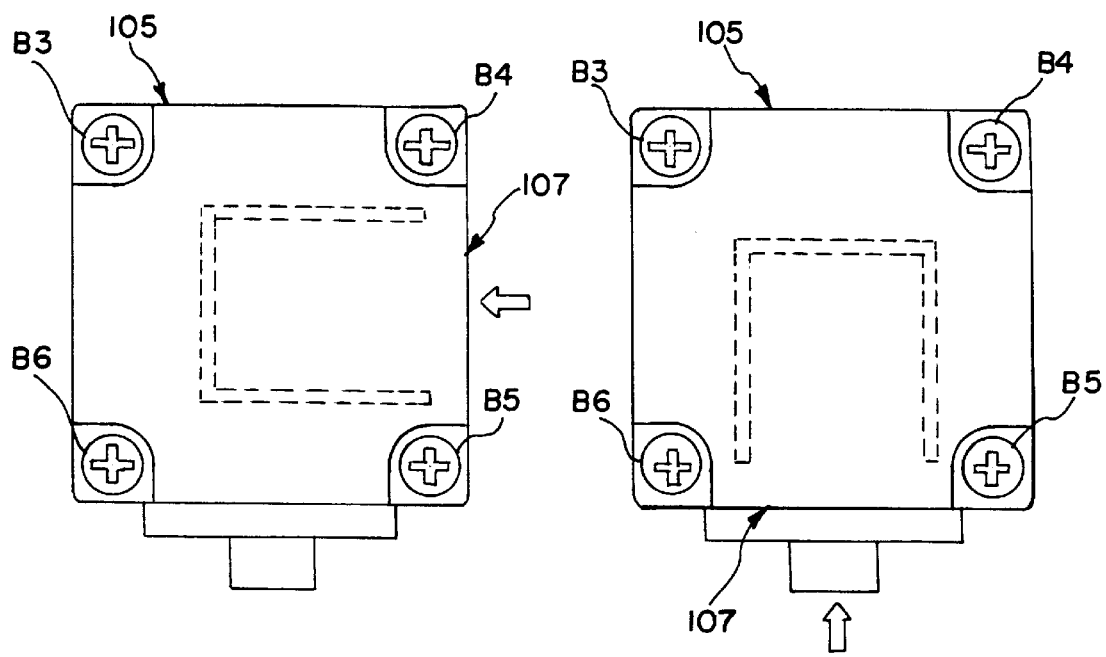

FIGS. 11A–11D are explanatory drawings for explaining the change of direction of the entry in the second embodiment. FIG. 11A shows a case that entry 107 of wiring coupler 53 shown in FIG. 9 is provided on the left side of the drawing and wiring coupler 53 is inserted from the direction shown by the arrow. FIG. 11B shows a case that entry 107 is provided in the upper part of the drawing and wiring coupler 53 is inserted from the direction shown by the arrow. FIG. 11C shows a case that entry 107 is provided on the right side of the drawing and wiring coupler 53 is inserted from the direction shown by the arrow. FIG. 11D shows a case that entry 107 is provided in the lower part of the drawing and wiring coupler 53 is inserted from the direction shown by the arrow.

Figures 12A, 12B:
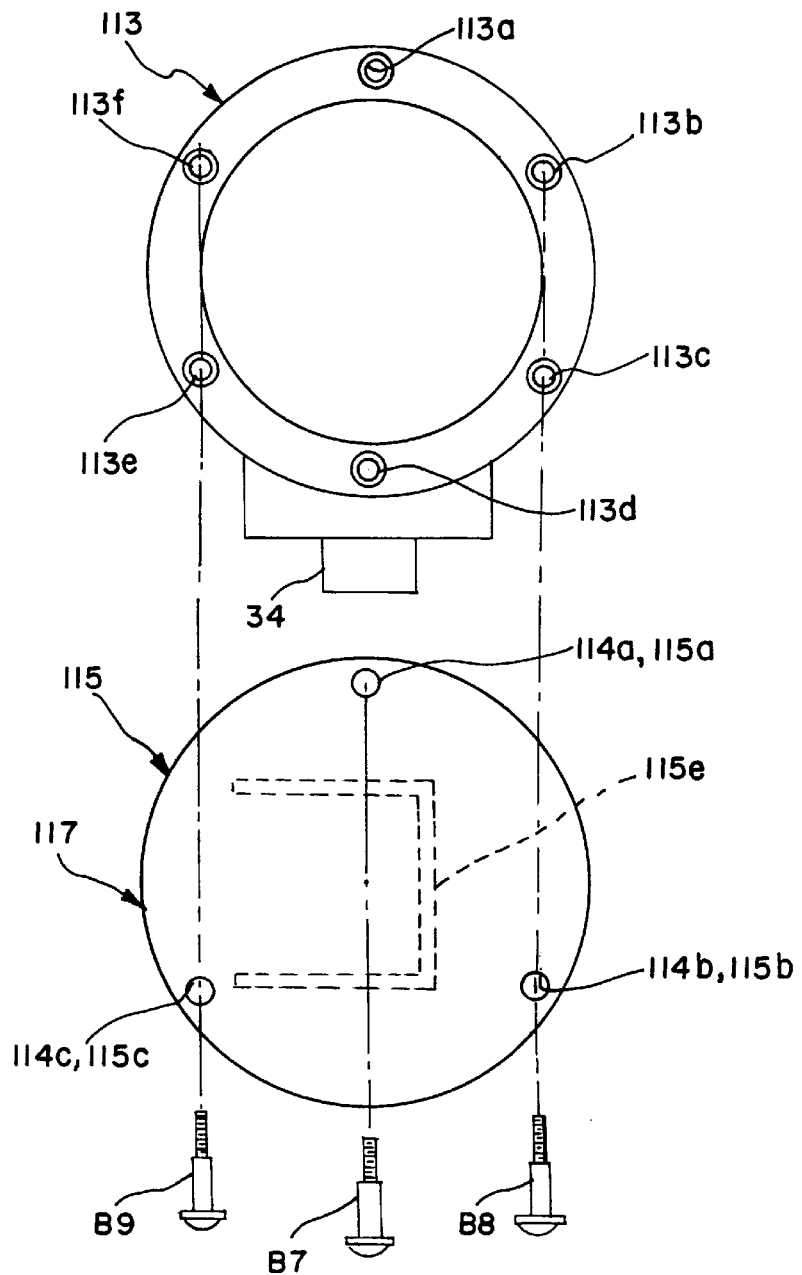
FIGS. 12A and 12B are explanatory drawings illustrating a third embodiment of the main switch.

FIGS. 12A and 12B are explanatory drawings illustrating a third embodiment of the main switch. FIG. 12A is a sectional view in the same position as in FIG. 7 showing a state in which a moving part and a crankshaft are fitted together. FIG. 12B is a bottom view showing a state in which an insulating plate and a cover are attached to a lock external cylinder.

As shown in FIG. 12A, crankshaft 111 is provided with a hexagonal end 111a at the lower end. Moving part 112 is provided with a hexagonal hole 112b on the end face of boss section 112a. Hexagonal hole 112 and hexagonal end 11a of crankshaft 111 are fitted. Moving part 112 may thus be turned by 60° once with respect to crankshaft 111 to be fitted.

As shown in FIG. 12B, lock external cylinder 113 is provided with female screws 113a, 113b, 113c, 113d, 113e and 113f at equal intervals along the periphery of the attachment face of insulating plate 114, which is not shown. Insulating plate 114 (on the rear side) and cover 115 are respectively provided with mounting holes 114a, 114b and 114c and mounting holes 115a, 115b and 115c at equal intervals along the periphery with the same pitch as that between the female screws of lock external cylinder 113. Cover 115 forms entry 117 for inserting wiring coupler 53 shown in FIG. 9 on the side of the opening of C-shaped internal wall section 115e together with insulating plate 114.

To attach the insulating plate 114 and the cover 115 to lock external cylinder 113, machine screw B7 is inserted into mounting holes 114a and 115a of insulating plate 114 and cover 115. Machine screw B7 is driven into female screw 113a of lock external cylinder 113. Similarly, machine screw B8 is inserted into mounting holes 114b and 115b. Machine screw B8 is driven into female screw 113c. Machine screw B9 is inserted into mounting holes 114c and 115c and is driven into female screw 113e.

To turn the position of entry 117 60° clockwise, insulating plate 114 and cover 115 have only to be turned 60° clockwise integrally with respect to lock external cylinder 113. That is, machine screw B7 is inserted into mounting holes 114a and 115a of insulating plate 114 and cover 115. Machine screw B7 is driven into female screw 113b of lock external cylinder 113. Similarly machine screw B8 is inserted into mounting holes 114b and 115b. Machine screw B8 is driven into the female screw 113d. Machine screw B9 is inserted into mounting holes 114c and 115c and is driven into the female screw 113f. Further, to turn the position of entry 117 60° once clockwise, insulating plate 114 and cover 115 have only to be turned integrally 60° once clockwise with respect to lock external cylinder 113. When insulating plate 114 and cover 115 are integrally turned, the above moving part 112 is also turned by the same angle.

Figure 13A:
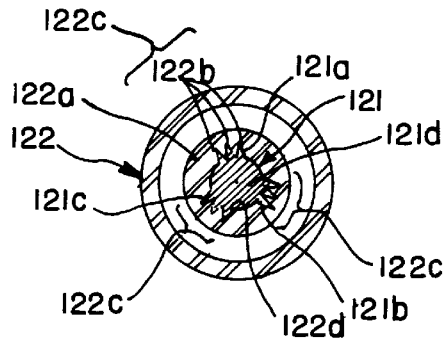
FIGS. 13A and 13B are explanatory drawings illustrating a fourth embodiment of the main switch.
Figure 13B:
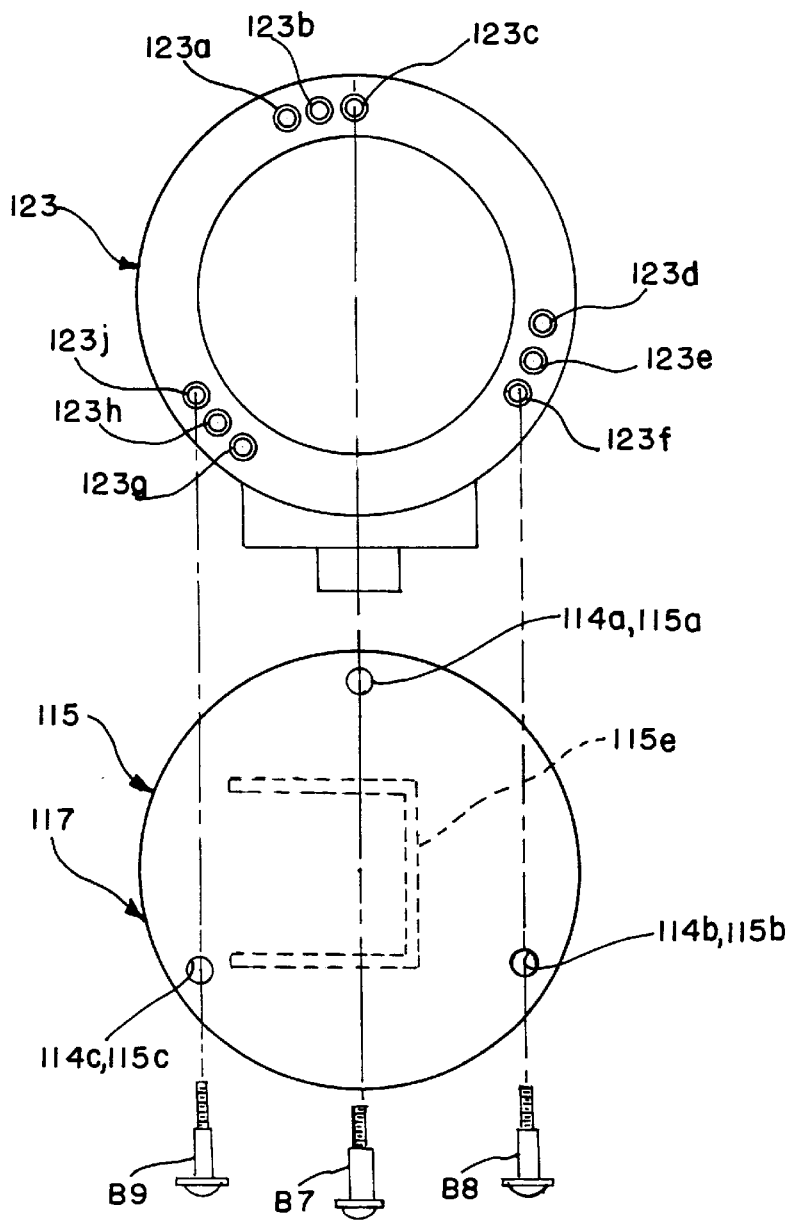
Figure 14:
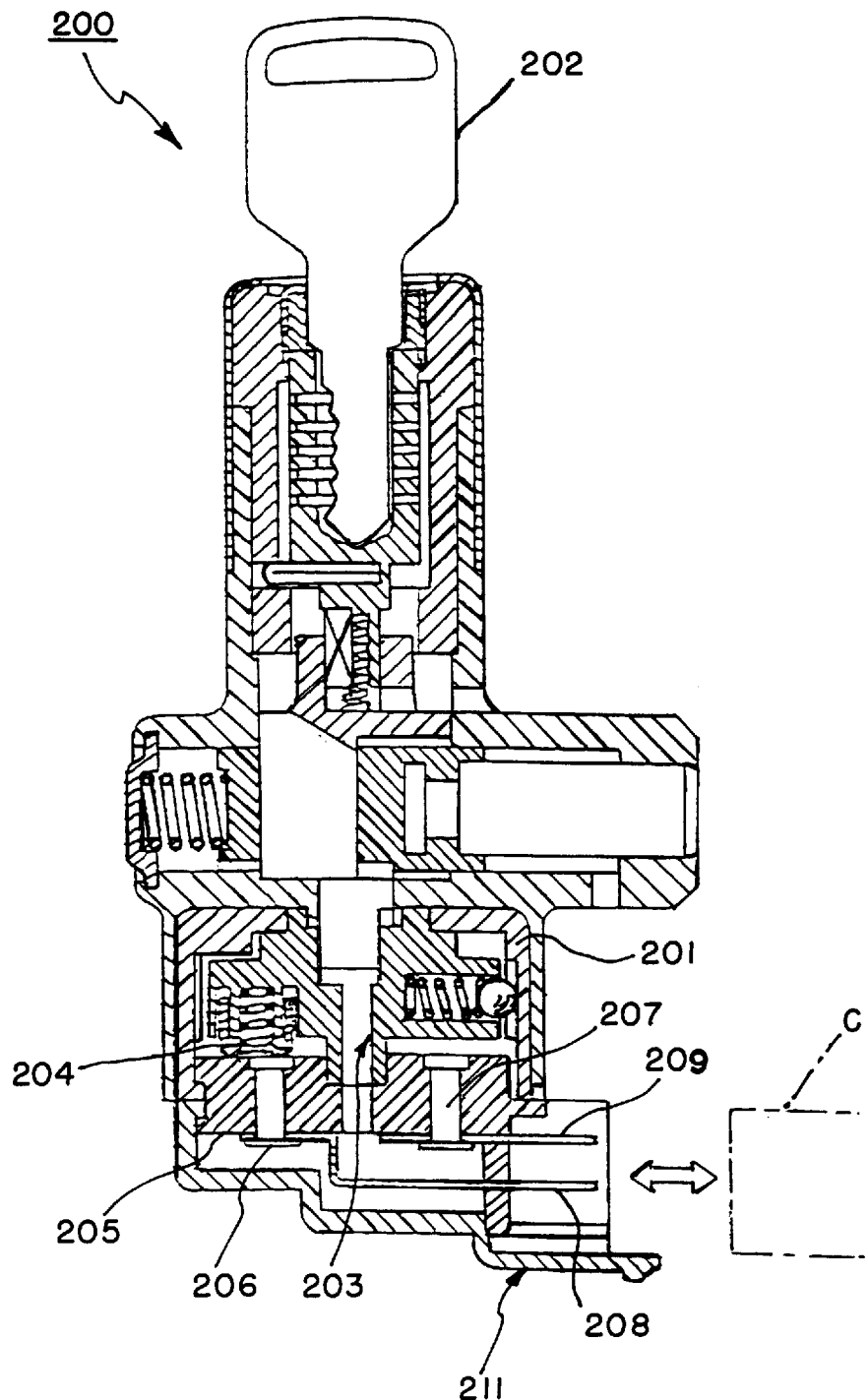
FIG. 14 is a sectional view illustrating a conventional steering locking device for a vehicle.

FIGS. 13A and 13B are explanatory drawings for explaining a fourth embodiment of the main switch. FIG. 13A is a sectional view in the same position in FIG. 7 showing a state in which a moving part and a crankshaft are fitted together. FIG. 13B is a bottom view showing a state in which an insulating plate and a cover are attached to a lock external cylinder.

As shown in FIG. 13A, crankshaft 121 is provided with an end 121d provided with three projections 121a, 121b and 121c which are formed at equal intervals along the lower end. Moving part 122 is provided with a hole 122d having three groups 122c of V-shaped grooves, each of which consist of three V-shaped grooves 122b formed every 10° on the inner periphery of boss section 122a at equal intervals. Hole 122d provided with V-shaped grooves 122b is engaged with end 121d of the crankshaft provided with projections 121. Moving part 122 can thus be engaged with crankshaft 121 by turning moving part 122 by 10°, 20°, 120°, 130°, 140°, 240°, 250° or 260°.

As shown in FIG. 13B, lock external cylinder 123 is provided with three female screws 123a, 123b and 123c formed every 10° on the periphery of the attachment face of insulating plate 114, which is not shown. Three female screws 123d, 123e and 123f are formed 120° clockwise from female screws 123a, 123b and 123c. Three female screws 123g, 123h and 123i are formed 120° clockwise from female screws 123d, 123e and 123f.

To attach insulating plate 114 (located on the rear side and not shown) and cover 115 to lock external cylinder 123, machine screw B7 is inserted into mounting holes 114a and 115a of insulating plate 114 and cover 115. Machine screw B7 is driven into female screw 123c of lock external cylinder 123. Similarly, machine screw B8 is inserted into mounting holes 114b and 115b. Machine screw B8 is driven into female screw 123f. Machine screw B9 is inserted into mounting holes 114c and 115c and is driven into the female screw 123i.

To turn the position of entry 117 by 10° counterclockwise, insulating plate 114 and cover 115 have only to be turned integrally 10° counterclockwise, teased upon lock external cylinder 123. That is, machine screw B7 is inserted into mounting holes 114a and 115a of insulating plate 114 and cover 115. Machine screw B7 is driven into female screw 123b of lock external cylinder 123. Similarly, machine screw B8 is inserted into mounting holes 114b and 115b. Machine screw B8 is driven into female screw 123e. Machine screw B9 is inserted into mounting holes 114c and 115c and is driven into female screw 123h. Further, to turn the position of the entry 117 by 10° counterclockwise, insulating plate 114 and cover 115 have only to be turned integrally by 10° counterclockwise, teased upon lock external cylinder 123.

To turn the initial position of entry 117 by 120° clockwise, insulating plate 114 and cover 115 have only to be turned integrally by 120° clockwise with respect to lock external cylinder 123. That is, machine screw B7 is inserted into mounting holes 114a and 115a of insulating plate 114 and cover 115. Machine screw B7 is driven into female screw 123f of lock external cylinder 123. Similarly, machine screw B8 is inserted into mounting holes 114b and 115b. Machine screw B8 is driven into the female screw 123i. Machine screw B9 is inserted into mounting holes 114c and 115c and is driven into female screw 123c. Further, to turn the position of entry 117 by 120° once clockwise, insulating plate 114 and cover 115 have only to be turned integrally by 120° once clockwise with respect to lock external cylinder 123. When insulating plate 114 and cover 115 are integrally turned, the above moving part 122 is also turned by the same angle.

The allowable turning of an entry for a wiring coupler according to the present invention is not limited to every 180°, every 120°, every 90°, every 60°, or every 10° described above, but also be other angles such as every 72° (enabled in five directions) and every 45° (enabled in eight directions) and is not required to be performed at equal intervals. In short, the position of entry has only to be turned so that an angle at which a moving part is attached to a crankshaft and an angle at which an insulating plate and a cover are attached to a lock external cylinder are equal.

A main switch for a vehicle according to the above embodiments is not limited to a motorcycle. The main switch can be used in a cycle car, an automobile, an electric motor car, a vehicle for work and others.

The above described embodiments provide the following advantages. In a main switch for a vehicle according to a first embodiment, a terminal pierces an insulating plate. A contact section is provided inside the insulating plate and a terminal section is provided outside the insulating plate. The contact section and the terminal section can thus be integrated. The terminal can therefore be readily attached and the number of parts can be reduced so that the cost can be reduced.

In a main switch for a vehicle according to a second embodiment, a terminal is fixed to an insulating plate by press-fitting. The terminal can be readily and securely fixed to the insulating plate. The terminal is therefore hardly rattled and disconnection may be avoided.

A force from the direction opposite to the side end face of a terminal section is supported in the direction of the width of the terminal section when a wiring coupler is inserted into an entry because in a third embodiment, a band plate is used for the terminal section. The band plate is surrounded by a cover. The entry for the wiring coupler is provided to the cover and the entry is opposite to one side end face of the band plate. The terminal section is hardly bent and a terminal can be prevented from being rattled.

A main switch according to a fourth embodiment comprises a lock external cylinder attached to a body. A crankshaft is housed in the lock external cylinder. A lock pin is reciprocated by the crankshaft. A moving member is fitted to the lower part of the crankshaft so that the moving member can be attached or detached. A terminal comes in sliding contact with a moving contact attached to the moving member. An insulating plate supports this terminal. A cover surrounds the lower part of the terminal which pierces the insulating plate. An entry for a wiring coupler is provided to the cover. Plural machine screws for fitting the cover and the insulating plate to the lock external cylinder and the moving member are engaged with the crankshaft so that the moving member, the insulating plate and the cover can be turned integrally by a predetermined angle in the direction of rotation of the crankshaft in a state in which the machine screws are unfastened and the moving member is detached from the crankshaft. The direction in which the wiring coupler is inserted can be varied depending upon the model used by a set of one type of the moving member, the insulating plate and the cover. The respective types of the moving member, the insulating plate and the cover depend upon the direction of insertion and are not required to be prepared in advance. The costs of manufacturing and management can be reduced.

In a main switch according to a fifth embodiment, a contact section and a terminal section can be integrated by piercing a terminal with an insulating plate, providing the contact section inside the insulating plate and providing the terminal section outside the insulating plate. The terminal can be readily attached. The number of parts can be reduced and the cost can be further reduced in addition to the reduction of costs of manufacturing and managing the respective types of the moving member, the insulating plate and the cover described with respect to the fourth embodiment.

In a main switch according to a sixth embodiment, a contact section and a terminal section can be integrated because a cover is constituted by an end section, an external wall section rising from the periphery of the end section, an internal wall section for surrounding the lower part of a terminal and an entry. A drain hole is provided in the lower location in a space between the internal and external wall sections when the entry is turned downward. The terminal can be readily attached. The number of parts can be reduced. Water in the space between the internal and external wall sections can be discharged from the drain hole. The terminal can be prevented from being damaged by water and the reliability of the main switch can be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A main switch for a vehicle comprising:
an insulating plate formed near an end of the main switch;
a terminal piercing through said insulating plate;
a contact section provided along a first side of said insulating plate inside the main switch; and
a terminal section provided along an opposite second side of said insulating plate external of the main switch,
a wiring coupler being insertable into said terminal section to contact said terminal,
said terminal section comprising a band plate which is surrounded by a cover,
an entry for the wiring coupler being provided through said cover opposite a side end face of said band plate.

2. The main switch of claim 1, wherein said terminal is fixedly pressfit to said insulating plate.

3. The main switch of claim 1, which is a motorcycle ignition switch.

4. A main switch for a vehicle comprising:
a switch body;
a lock external cylinder attached to said switch body;
a crankshaft housed within said lock external cylinder;
a lock pin extended and withdrawn by said crankshaft;
a moving member detachably fitted to a lower part of said crankshaft, said moving member having a movable contact;
a terminal slidingly contactable with said movable contact;
an insulating plate for supporting said terminal, said terminal piercing through said insulating plate;
a cover for covering a lower part of said terminal which pierces through said insulating plate, an entry for a wiring coupler being provided through said cover; and
plural fastening members for mounting said cover and said insulating plate to said lock external cylinder,
said moving member being fitted to said crankshaft so that said moving member, said insulating plate and said cover can be turned together through a predetermined angle in a direction of rotation of said crankshaft when said plural fastening members are unfastened and said moving member is detached from said crankshaft.

5. The main switch of claim 4, further comprising:
a contact section provided along a first side of said insulating plate inside the main switch; and
a terminal section provided along an opposite second side of said insulating plate within said cover.

6. The main switch of claim 4, wherein said cover comprises:
an end section;
an external wall section rising from a periphery of said end section;
an internal wall section covering a lower part of said terminal; and
a drain hole formed in said end section between said external wall section and said internal wall section.

7. The main switch of claim 4, which is a motorcycle ignition switch.

8. The main switch of claim 4, wherein said plural fastening members are machine screws.

9. The main switch of claim 4, wherein said terminal is pressfit to said insulating plate.

10. A main switch for a vehicle comprising:
a lock external cylinder;
a crankshaft housed within said lock external cylinder;
a moving member detachably fitted to a lower part of said crankshaft, said moving member having a movable contact;
at least one terminal slidingly contactable with said movable contact;
an insulating plate removably secured to said moving member, said at least one terminal extending through and being supported in a lateral direction by said insulating plate; and
a cover removably secured to said moving member through said insulating plate, said cover having corresponding slots formed in a base thereof for receiving and supporting in the lateral direction an end of said at least one terminal which extends through said insulating plate, said cover also having a window through which a wiring coupler may be detachably coupled to said at least one terminal.

11. The main switch of claim 10, wherein said moving member, said insulating plate and said cover are turnable together through predetermined angles in a direction of rotation of said crankshaft when removed from the lower part of said crankshaft, said moving member, said insulating plate and said cover remountable so that the window of said cover is alignable in different directions.

12. The main switch of claim 10, wherein said cover comprises:

an internal wall section rising from a base of said cover around a periphery of said slots;

an external wall section rising from an outermost periphery of said cover, the window of said cover being formed in said external wall section, an opening being formed in said internal wall section in corresponding alignment with the window; and a drainhole formed in a base of said cover between said internal wall section and said external wall section.

13. The main switch of claim 10, which is a motorcycle ignition switch.

14. The main switch of claim 10, wherein said cover is removably secured to said moving member through said insulating plate using machine screws.

15. The main switch of claim 10, wherein said at least one terminal comprises plural terminals.

16. The main switch of claim 10, wherein said at least one terminal is pressfit to said insulating plate.

\* \* \* \* \*